United States Patent
Bradley et al.

(10) Patent No.: US 9,952,749 B2
(45) Date of Patent: *Apr. 24, 2018

(54) REPRODUCING STATE OF SOURCE ENVIRONMENT WHEN IMAGE WAS SCREEN CAPTURED ON A DIFFERENT COMPUTING DEVICE USING RESOURCE LOCATION, RESOURCE NAVIGATION AND POSITIONAL METADATA EMBEDDED IN IMAGE

(71) Applicant: International Business Machines Corporation, Armonk, NY (US)

(72) Inventors: Lisa M. Bradley, Cary, NC (US); Brian O'Donovan, Dublin (IE); Aaron J. Quirk, Cary, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 268 days.

This patent is subject to a terminal disclaimer.

(21) Appl. No.: 14/704,204

(22) Filed: May 5, 2015

(65) Prior Publication Data
US 2016/0105482 A1  Apr. 14, 2016

Related U.S. Application Data

(63) Continuation of application No. 14/509,258, filed on Oct. 8, 2014.

(51) Int. Cl.
*G06F 15/16* (2006.01)
*G06F 3/0484* (2013.01)
(Continued)

(52) U.S. Cl.
CPC .......... *G06F 3/0484* (2013.01); *G06F 3/1454* (2013.01); *G06F 17/2247* (2013.01);
(Continued)

(58) Field of Classification Search
CPC ....... H04L 67/06; H04L 67/02; G06F 3/0484; G06F 3/1454; G06F 17/2247;
(Continued)

(56) References Cited

U.S. PATENT DOCUMENTS 5,390,188 A * 2/1995 Dawson .............. H04L 43/0847
714/706
8,060,795 B2  11/2011 Bakekolo et al.
(Continued)

OTHER PUBLICATIONS

List of IBM Patents or Patent Applications Treated as Related, May 5, 2015, pp. 1-2.
(Continued)

*Primary Examiner* — Thu Ha Nguyen
(74) *Attorney, Agent, or Firm* — Robert A. Voigt, Jr.; Winstead, P.C.

(57) ABSTRACT

A method, system and computer program product for facilitating access to a resource represented in an image at a later time. A screen capture of an image displayed on a computing device is implemented. Metadata, including the resource location, resource navigation and positional metadata, regarding the source data of the screen capture image is generated. The generated metadata is then embedded into the screen capture image. The screen capture image with the embedded metadata is then transmitted to a different user. By embedding the metadata into the screen capture image, the user receiving the screen capture image will be able to reproduce the state of the source environment when the image was captured using the embedded metadata thereby opening the resource represented in the image.

9 Claims, 5 Drawing Sheets

(51) Int. Cl.
*H04N 1/21* (2006.01)
*G06F 17/22* (2006.01)
*G06T 1/00* (2006.01)
*H04L 29/08* (2006.01)
*H04W 4/02* (2018.01)
*G06Q 10/10* (2012.01)
*G06F 3/14* (2006.01)
*H04W 4/12* (2009.01)

(52) U.S. Cl.
CPC .......... *G06Q 10/10* (2013.01); *G06T 1/0007* (2013.01); *H04L 67/02* (2013.01); *H04L 67/06* (2013.01); *H04N 1/2125* (2013.01); *H04W 4/02* (2013.01); *H04W 4/12* (2013.01)

(58) Field of Classification Search
CPC .... G06Q 10/10; G06T 1/0007; H04N 1/2125; H04W 4/02; H04W 4/12
USPC .................................................. 709/217, 203
See application file for complete search history.

(56) References Cited

U.S. PATENT DOCUMENTS

| | | | |
|---|---|---|---|
| 8,694,884 B2 | 4/2014 | Dovey et al. | |
| 8,788,773 B2 | 7/2014 | Goodman et al. | |
| 8,935,322 B1* | 1/2015 | Grosz | G06F 3/04842 709/203 |
| 9,589,296 B1* | 3/2017 | Li | G06Q 30/0641 |
| 9,792,301 B2* | 10/2017 | Rodriguez-Serrano | G06F 17/30253 |
| 2004/0236547 A1* | 11/2004 | Rappaport | G06F 17/509 703/2 |
| 2006/0092847 A1* | 5/2006 | Mohan | H04L 12/2602 370/241.1 |
| 2006/0285489 A1* | 12/2006 | Francisco | H04L 12/2602 370/229 |
| 2006/0285665 A1* | 12/2006 | Wasserblat | G10L 17/26 379/114.14 |
| 2007/0003150 A1* | 1/2007 | Xu | G06F 3/03545 382/237 |
| 2007/0097421 A1* | 5/2007 | Sorensen | G06F 17/30265 358/1.15 |
| 2007/0216776 A1* | 9/2007 | Woolfe | H04N 1/6086 348/222.1 |
| 2008/0037825 A1 | 2/2008 | Lofgren et al. | |
| 2010/0091669 A1* | 4/2010 | Liu | H04L 45/20 370/252 |
| 2010/0251233 A1* | 9/2010 | Majewski | G06F 3/038 718/1 |
| 2010/0328726 A1* | 12/2010 | Babbrah | H04N 1/2179 358/1.18 |
| 2011/0026828 A1* | 2/2011 | Balasubramanian | G06F 17/243 382/187 |
| 2011/0202854 A1 | 8/2011 | Chan et al. | |
| 2011/0202967 A1* | 8/2011 | Hecht | G11B 27/034 725/114 |
| 2012/0254454 A1* | 10/2012 | Margush | H04L 12/1827 709/231 |
| 2013/0212477 A1* | 8/2013 | Averbuch | H04N 21/4725 715/719 |
| 2014/0176536 A1* | 6/2014 | Kern | G06F 17/30259 345/419 |
| 2014/0213191 A1* | 7/2014 | Courtice | H04W 40/12 455/67.11 |
| 2014/0233861 A1* | 8/2014 | Tan | G06K 15/40 382/218 |
| 2014/0304019 A1* | 10/2014 | Scott | G06Q 10/06311 705/7.15 |
| 2015/0180989 A1* | 6/2015 | Seth | G06Q 30/0277 709/224 |
| 2015/0281258 A1* | 10/2015 | Watkins | G06Q 30/0277 726/23 |
| 2016/0012465 A1* | 1/2016 | Sharp | G06Q 20/18 705/14.17 |
| 2016/0042233 A1* | 2/2016 | Sen | G06K 9/00671 345/633 |
| 2016/0044125 A1* | 2/2016 | Hardin | H04L 67/2823 709/219 |
| 2016/0073286 A1* | 3/2016 | Wang | H04W 28/0236 370/332 |
| 2016/0105482 A1* | 4/2016 | Bradley | H04N 1/2125 715/751 |
| 2017/0091208 A1* | 3/2017 | Quan | G06F 17/30091 |
| 2017/0132742 A1* | 5/2017 | DeLuca | G06T 1/0021 |
| 2017/0255820 A1* | 9/2017 | Liu | G06K 9/00288 |

OTHER PUBLICATIONS

Office Action for U.S. Appl. No. 14/509,258 dated Oct. 7, 2016, pp. 1-19.
Nadav Soferman, "Website Screenshot Creation and Manipulation with URL2PNG and Cloudinary," http://cloudinary.com/blog/website_screenshot_creation_and_manipulation_with_url2png_and_cloudinary, Mar. 25, 2014, pp. 1-4.
Office Action for U.S. Appl. No. 14/509,258 dated May 11, 2017, pp. 1-16.
Office Action for U.S. Appl. No. 14/509,258 dated Aug. 29, 2017, pp. 1-16.
Office Action for U.S. Appl. No. 14/509,258 dated Feb. 22, 2018, pp. 1-23.

* cited by examiner

REPRODUCING STATE OF SOURCE ENVIRONMENT WHEN IMAGE WAS SCREEN CAPTURED ON A DIFFERENT COMPUTING DEVICE USING RESOURCE LOCATION, RESOURCE NAVIGATION AND POSITIONAL METADATA EMBEDDED IN IMAGE

TECHNICAL FIELD

The present invention relates generally to screenshots or screen captures, and more particularly to reproducing the state of the source environment when an image was screen captured on a different computing device using metadata embedded in the screen capture image, including resource location, resource navigation and positional metadata.

BACKGROUND

A screenshot or screen capture is an image taken by the computing system to record the visible image of the item(s) displayed on the computing system. Screen captures of an image displayed on a computing system are a convenient way for a user to quickly share information with other users. For example, it may be more convenient for a user to capture an image of a product being sold on a store's online marketplace and send it to the user's friend to get an opinion or feedback regarding the product, such as via multimedia messaging service (MMS), rather than sending a link to the web page of the product. Upon receipt, the user's friend will be able to view an image of the user's screen containing the product being sold on the online marketplace. The user's friend can then share his/her thoughts about the product with the user.

However, the user only receives an image of the product which does not contain any information about the product. If the user's friend wants more information about the product to provide a better opinion or feedback regarding the product, the user would have to manually enter the store's online marketplace's website and search for the product on the store's online marketplace's website. Such a process is tedious and cumbersome. Furthermore, such a process may be more complicated if there are multiple versions of the product thereby making it more difficult for the user's friend to locate the appropriate record on the website.

Alternatively, the user's friend may ask the user for a link to the web page of the product. However, with the advent of asynchronous operations on websites, the link (uniform resource locator (URL)) may not match the actual content on the web page represented by the screenshot.

Hence, there is not currently a means for the user receiving a screen capture image to open the resource represented in the image at a later time. That is, there is not currently a means for the user receiving the screen capture image to reproduce the state of the source environment when the image was captured.

BRIEF SUMMARY

In one embodiment of the present invention, a method for facilitating access to a resource represented in an image at a later time comprises implementing a screen capture of an image displayed on a first user's computing device. The method further comprises generating, by a processor, metadata comprising resource location, resource navigation and positional metadata regarding source data of the screen capture image. The method additionally comprises embedding the generated metadata into the screen capture image. Furthermore, the method comprises transmitting the screen capture image with the embedded metadata to a second user.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for facilitating access to a resource represented in an image at a later time. In one embodiment of the present invention, a screen capture of an image displayed on a computing device is implemented. Metadata, including the resource location, resource navigation and positional metadata, regarding the source data of the screen capture image is generated. The generated metadata is then embedded into the screen capture image. The screen capture image with the embedded metadata is then transmitted to a different user. By embedding the metadata into the screen capture image, the user receiving the screen capture image will be able to reproduce the state of the source environment when the image was captured thereby opening the resource represented in the image. The metadata in the received screen capture image is extracted to identify the resource location, resource navigation and positional data (e.g., compression type, data precision, image height, image width, reference to the base uniform resource identifier, reference to the navigational operation vector and reference to the scroll location). The state of the source environment when the image was captured is then reproduced (i.e., the source document is opened in the same state as represented in the screen capture image) using the resource location, resource navigation and positional data.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
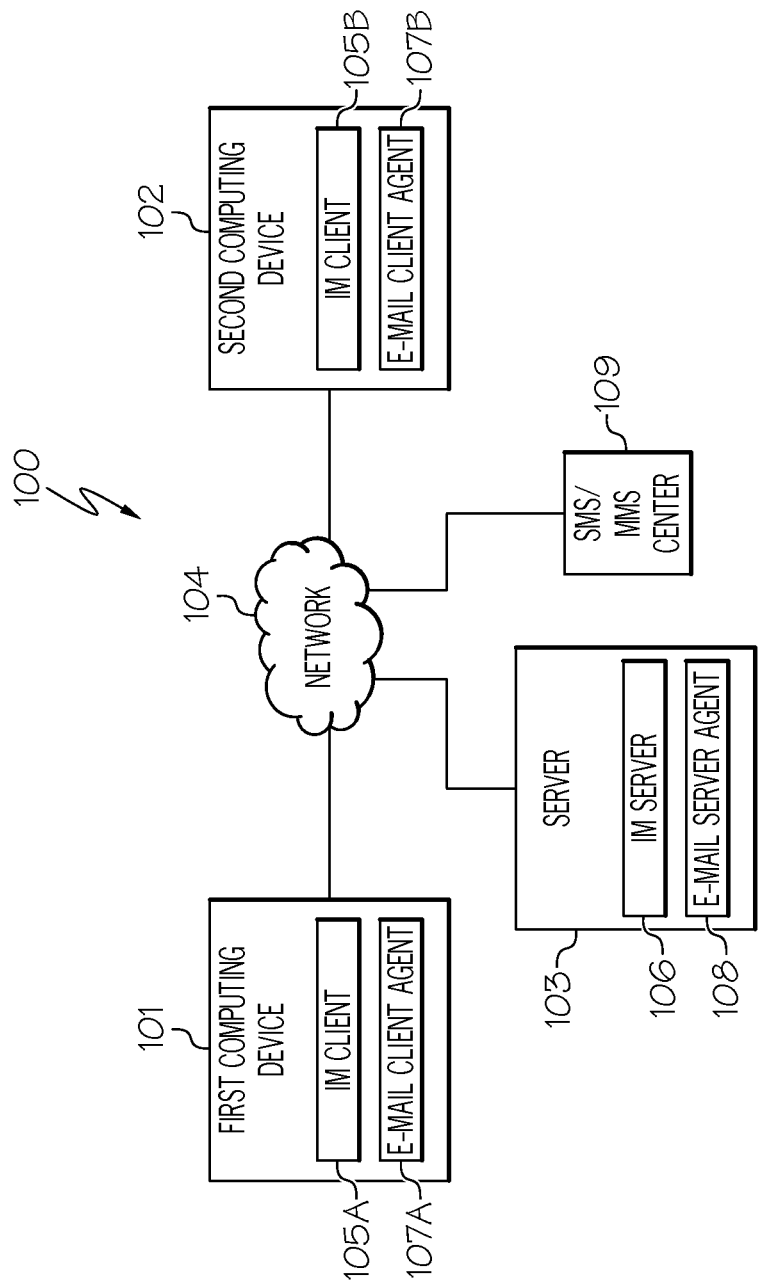
FIG. 1 illustrates a communication system configured in accordance with an embodiment of the present invention.

Referring now to the Figures in detail, FIG. 1 illustrates a communication system 100 for practicing the principles of the present invention in accordance with an embodiment of the present invention. Communication system 100 includes a first computing device 101 and a second computing device 102 connected to a server 103 via a network 104. The "first computing device 101," as used herein, refers to the computing device that generates a screen capture of an image, such as an image of an item(s) being displayed on a website, along with metadata embedded into the screen capture image, as discussed further below. The "second computing device 102," as used herein, refers to the computing device that receives the screen capture image with the embedded metadata and is able to reproduce the state of the source environment when the image was captured thereby being able to open the resource represented in the image using the embedded metadata as discussed further below.

Computing devices 101, 102 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 104 and consequently communicating with one another. A description of the hardware configuration of computing devices 101, 102 is provided below in connection with FIG. 2.

Network 104 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, computing devices 101, 102 include a software agent, referred to herein as an Instant Messaging (IM) client 105A-105B, respectively. Instant messaging clients 105B-105B may collectively or individually be referred to as instant messaging clients 105 or instant messaging client 105, respectively. Furthermore, server 103 includes a software agent, referred to herein as the Instant Messaging (IM) server 106. IM client 105 provides the functionality to send and receive instant messages. As messages are received, IM client 105 presents the messages to the user in a dialog window (or IM window). Furthermore, IM client 105 provides the functionality for computing devices 101, 102 to connect to the IM server 106 which provides the functionality of distributing the instant messages to the IM clients 105 associated with each of the sharing users.

Furthermore, computing devices 101, 102 include a software agent, referred to herein as an e-mail client agent 107A-107B, respectively. E-mail client agents 107A-107B may collectively or individually be referred to as e-mail client agents 107 or e-mail client agent 107, respectively. Furthermore, server 103 may include a software agent, referred to herein as the e-mail server agent 108. E-mail client agent 107 enables the users of computing devices 101, 102 to create, send and receive e-mails. E-mail server agent 108 is configured to receive e-mail messages from computing devices 101, 102 and distribute the received e-mail messages among the computing devices 101, 102.

Communication system 100 further includes a Short Message Service (SMS)/Multimedia Messaging Service (MMS) center 109 configured to relay, store and forward text or multimedia messages, such as SMS or MMS messages, among computing devices 101, 102.

System 100 is not to be limited in scope to any one particular network architecture. System 100 may include any number of computing devices 101, 102, servers 103, networks 104 and SMS/MMS centers 109. For example, communication system 100 may include any number of second computing devices 102 that receive the screen capture image with the embedded metadata, such as from first computing device 101, and are able to reproduce the state of the source environment when the image was captured thereby being able to open the resource represented in the image using the embedded metadata.

Figure 2:
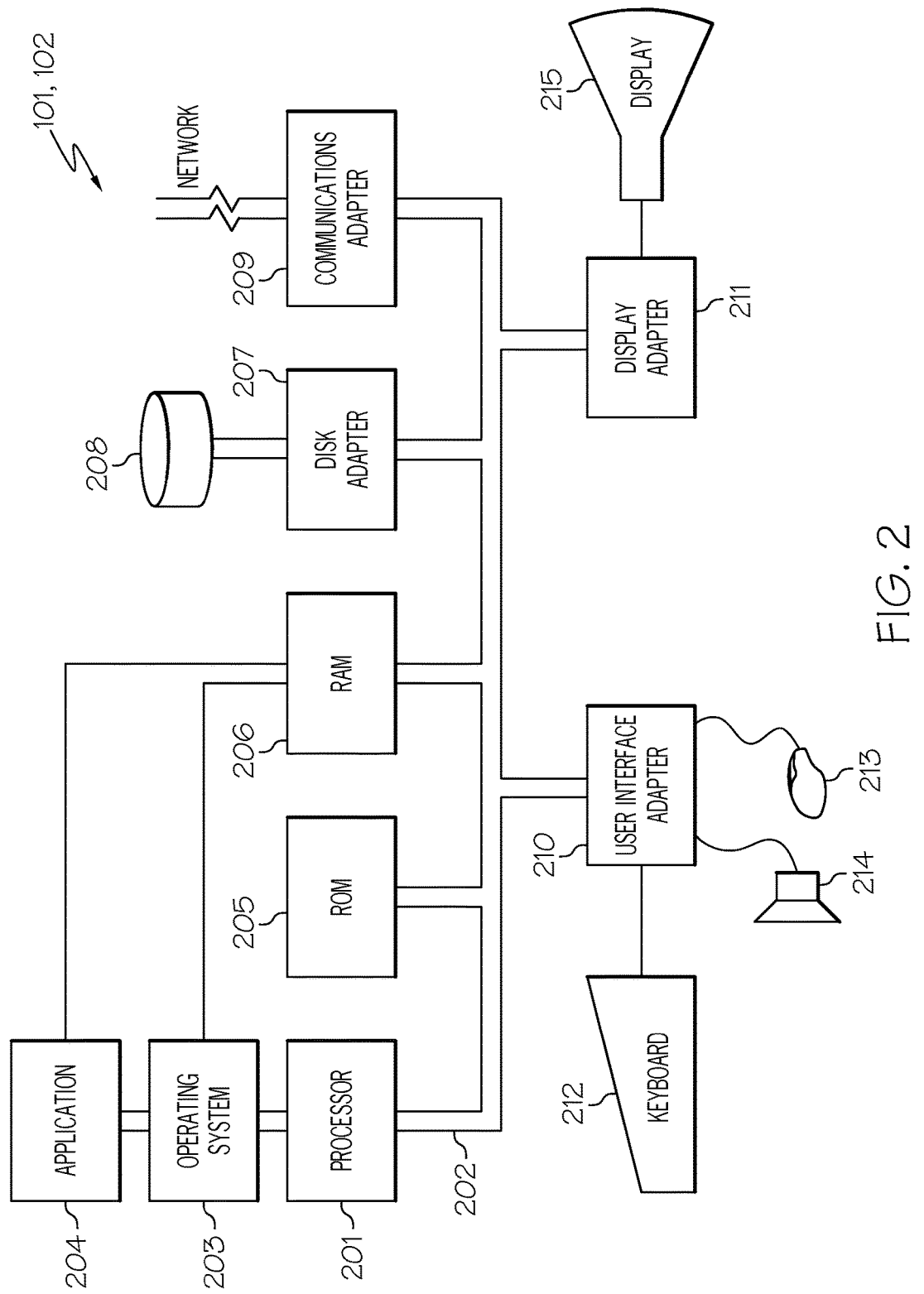
FIG. 2 illustrates a hardware configuration of a computing device for practicing the principles of the present invention in accordance with an embodiment of the present invention.

Referring now to FIG. 2, FIG. 2 illustrates a hardware configuration of computing devices 101, 102 (FIG. 1) which is representative of a hardware environment for practicing the present invention. Referring to FIG. 2, computing devices 101, 102 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 in computing device 101 may include, for example, an application for facilitating access to a resource represented in an image at a later time as discussed below in association with FIGS. 3 and 4. Application 204 in computing device 102 may include, for example, an application for reproducing the state of the source environment when the image was screen captured thereby being able to open the resource represented in the image using metadata embedded in the screen capture image as discussed below in association with FIGS. 4 and 5.

Referring again to FIG. 2, read-only memory ("ROM") 205 is coupled to system bus 202 and includes a basic input/output system ("BIOS") that controls certain basic functions of computing devices 101, 102. Random access memory ("RAM") 206 and disk adapter 207 are also coupled to system bus 202. It should be noted that software components including operating system 203 and application 204 may be loaded into RAM 206, which may be computing devices 101, 102 main memory for execution. Disk adapter 207 may be an integrated drive electronics ("IDE") adapter that communicates with a disk unit 208, e.g., disk drive. It is noted that the program for facilitating access to a resource represented in an image at a later time, as discussed below in association with FIGS. 3 and 4, may reside in disk unit 208 or in application 204. Furthermore, it is noted that the program for reproducing the state of the source environment when the image was screen captured thereby being able to open the resource represented in the image using metadata embedded in the screen capture image, as discussed below in association with FIGS. 4 and 5, may reside in disk unit 208 or in application 204.

Computing devices 101, 102 may further include a communications adapter 209 coupled to bus 202. Communications adapter 209 interconnects bus 202 with an outside network (e.g., network 104 of FIG. 1) thereby enabling computing devices 101, 102 to communicate with each other, server 103 and SMS/MMS center 109.

I/O devices may also be connected to computing devices 101, 102 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to computing devices 101, 102 through keyboard 212 or mouse 213 and receiving output from computing devices 101, 102 via display 215 or speaker 214.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, a screenshot or screen capture is an image taken by the computing system to record the visible image of the item(s) displayed on the computing system. Screen captures of an image displayed on a computing system are a convenient way for a user to quickly share information with other users. For example, it may be more convenient for a user to capture an image of a product being sold on a store's online marketplace and send it to the user's friend to get an opinion or feedback regarding the product, such as via multimedia messaging service (MMS), rather than sending a link to the web page of the product. Upon receipt, the user's friend will be able to view an image of the user's screen containing the product being sold on the online marketplace. The user's friend can then share his/her thoughts about the product with the user. However, the user only receives an image of the product which does not contain any information about the product. If the user's friend wants more information about the product to provide a better opinion or feedback regarding the product, the user would have to manually enter the store's online marketplace's website and search for the product on the store's online marketplace's website. Such a process is tedious and cumbersome. Furthermore, such a process may be more complicated if there are multiple versions of the product thereby making it more difficult for the user's friend to locate the appropriate record on the website. Alternatively, the user's friend may ask the user for a link to the web page of the product. However, with the advent of asynchronous operations on websites, the link (uniform resource locator (URL)) may not match the actual content on the web page represented by the screenshot. Hence, there is not currently a means for the user receiving a screen capture image to open the resource represented in the image at a later time. That is, there is not currently a means for the user receiving the screen capture image to reproduce the state of the source environment when the image was captured.

Figure 3:
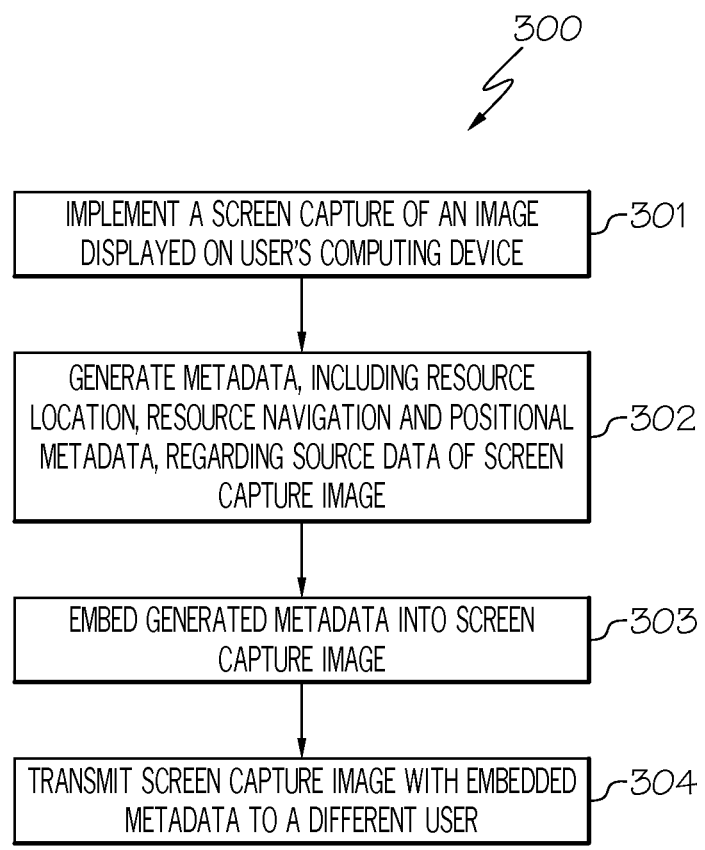
FIG. 3 is a flowchart of a method for facilitating access to a resource represented in an image at a later time in accordance with an embodiment of the present invention.
Figure 4:
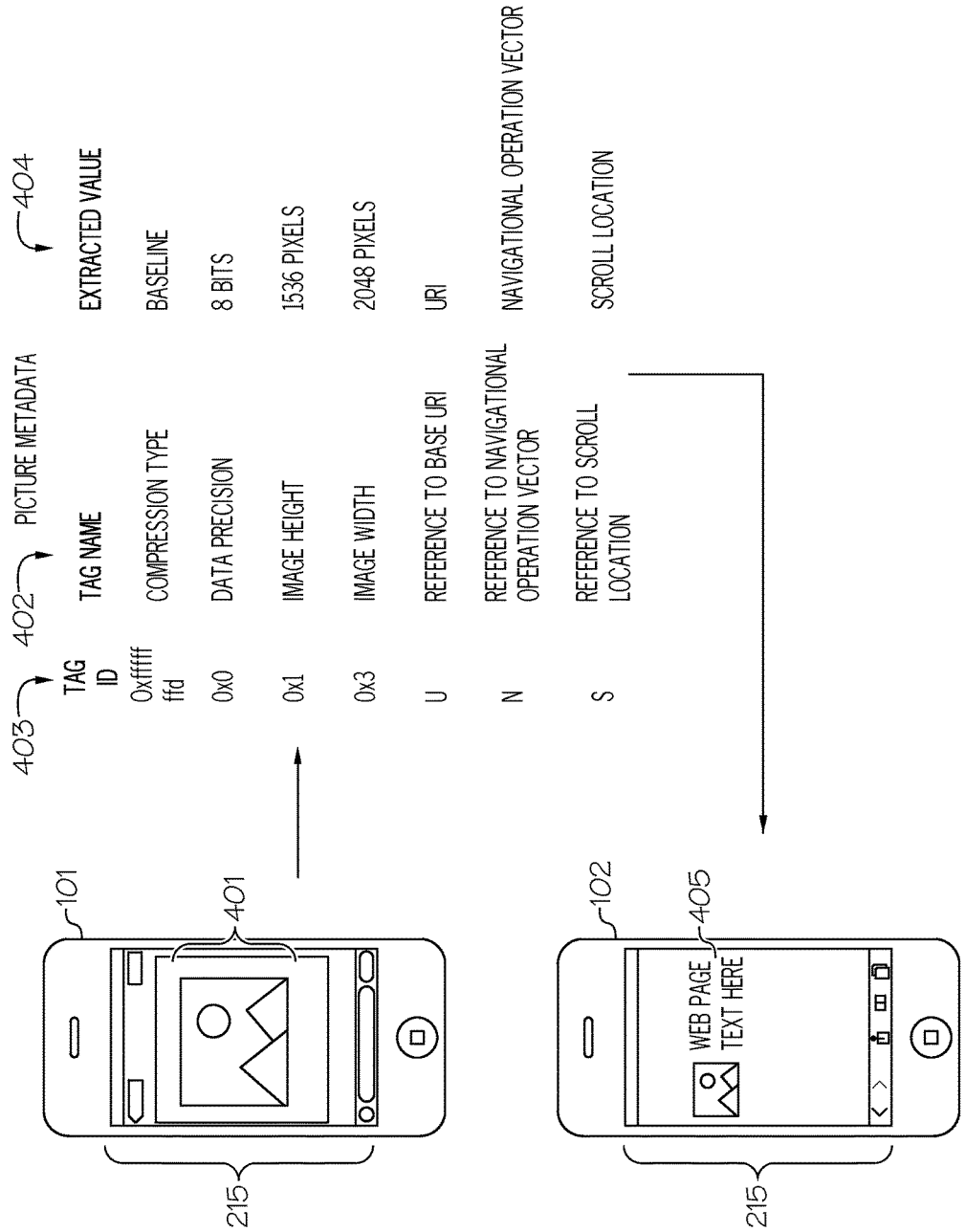
FIG. 4 illustrates implementing a screen capture of an image displayed on a first computing device, embedding metadata into the screen capture image and having a user of a second computing device reproduce the state of the source environment when the image was captured using the embedded metadata in accordance with an embodiment of the present invention.
Figure 5:
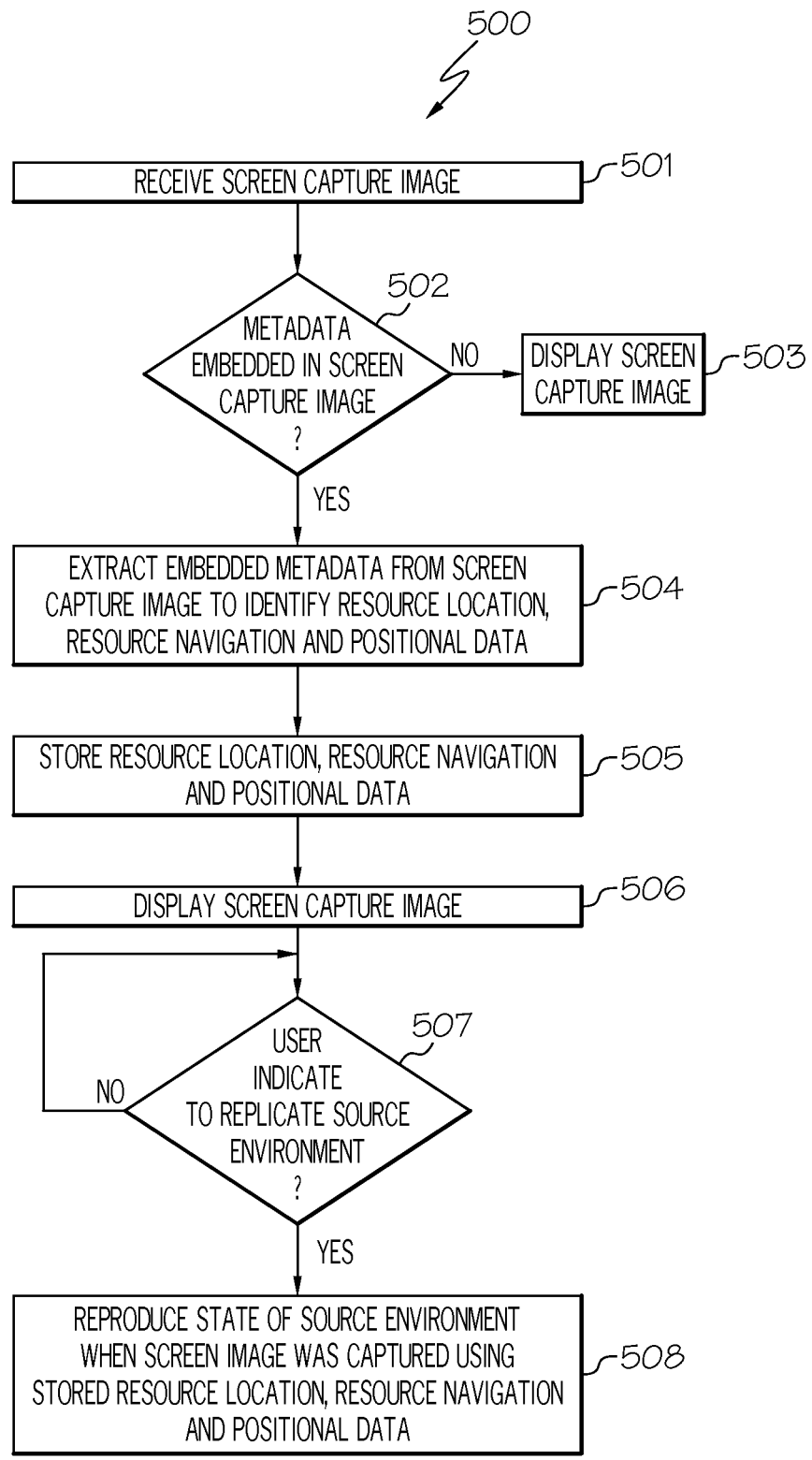
FIG. 5 is a flowchart of a method for reproducing the state of the source environment when the image was screen captured thereby being able to open the resource represented in the screen capture image using metadata embedded in the screen capture image in accordance with an embodiment of the present invention.

The principles of the present invention provide a means for enabling the user receiving the screen capture image to reproduce the state of the source environment when the image was captured thereby opening the resource represented in the image by embedding metadata (e.g., resource location, resource navigation and/or positional metadata) into the screen capture image as discussed below in connection with FIGS. 3-5. FIG. 3 is a flowchart of a method for facilitating access to a resource represented in an image at a later time. FIG. 4 illustrates implementing a screen capture of an image displayed on a first computing device, embedding metadata into the screen capture image and having a user of a second computing device reproduce the state of the source environment when the image was captured using the embedded metadata. FIG. 5 is a flowchart of a method for reproducing the state of the source environment when the image was screen captured thereby being able to open the resource represented in the screen capture image using metadata embedded in the screen capture image.

As stated above, FIG. 3 is a flowchart of a method 300 for facilitating access to a resource represented in an image at a later time in accordance with an embodiment of the present invention.

Referring to FIG. 3, in conjunction with FIGS. 1-2, in step 301, computing device 101 implements a screen capture of an image displayed on computing device 101. The image captured can include an image of an item(s) depicted on the entirety of display 215 or a portion of display 215.

In step 302, computing device 101 generates metadata, including resource location, resource navigation and positional metadata, regarding the source data of the screen capture image. An example of resource location metadata includes the uniform resource locator of a webpage containing the captured image. An example of resource navigation metadata includes an ordered vector of uniform resource locator requests. For instance, if a user performs ten actions to arrive at a certain state, such information can be captured in the resource navigation metadata. Hence, the resource navigation metadata captures the usage history and navigation patterns of the user to recreate the screen capture. Such information may be used to recreate the screen capture in situations involving asynchronous operations, such as asynchronous REST calls generated by the user which would not be represented in a uniform resource locator. In such a case, the reloading of the uniform resource locator would not recreate the page. Furthermore, examples of positional metadata include a scroll location, a compression type, a device resolution and a width and a height of the captured image.

In step 303, computing device 101 embeds the generated metadata into the screen capture image. In one embodiment, the generated metadata is embedded in a preamble or a postamble in the image data. In another embodiment, the generated metadata is embedded as steganographic data directly into the pixels of the screen capture image. By embedding the metadata into the screen capture image, a user will be able to reproduce the state of the source environment when the image was captured thereby opening the resource represented in the image as discussed further below.

In step 304, computing device 101 transmits the screen capture image with the embedded metadata to a different user, such as the user of computing device 102.

An illustration of implementing a screen capture of an image displayed on computing device 101 and embedding metadata into the screen capture image is provided in FIG. 4.

FIG. 4 illustrates implementing a screen capture of an image displayed on computing device 101, embedding metadata into the screen capture image and having a user of a second computing device 102 reproduce the state of the source environment when the image was captured using the embedded metadata in accordance with an embodiment of the present invention.

Referring to FIG. 4, in conjunction with FIGS. 1-3, a screen capture of an image 401 displayed on display 215 of computing device 101 is implemented. Metadata, in the form of tag names 402 and tag identifiers 403 ("tag id"), are generated. For example, metadata (tag names 402), such as the compression type, data precision, image height, image width, reference to the base uniform resource identifier, reference to the navigational operation vector and reference to the scroll location, can be generated in step 302. A tag identifier 403 corresponding to the tag name 402 may be generated, such as 0xffffffd for the compression type, 0x0 for data precision, 0x1 for image height, 0x3 for image width, U for the reference to the base uniform resource identifier, N for the reference to the navigational operation vector and S for the reference to the scroll location. As discussed above, such metadata is embedded in the screen capture image and transmitted to a different user, such as the user of computing device 102.

The user of computing device 102 receives the screen capture image and is able to reproduce the state of the source environment when the image was screen captured thereby being able to open the resource represented in the image using metadata embedded in the screen capture image as discussed below in connection with FIG. 5.

FIG. 5 is a flowchart of a method 500 for reproducing the state of the source environment when the image was screen captured thereby being able to open the resource represented in the screen capture image using metadata embedded in the screen capture image in accordance with an embodiment of the present invention.

Referring to FIG. 5, in conjunction with FIGS. 1-4, in step 501, computing device 102 receives the screen capture image.

In step 502, computing device 102 determines whether metadata is embedded in the received screen capture image. If metadata is not embedded in the received screen capture image, then, in step 503, computing device 102 displays the received screen capture image with no option for replicating the source environment.

If, however, metadata, such as the metadata generated in step 302, is embedded in the received screen capture image, then, in step 504, computing device 102 extracts the embedded metadata from the screen capture image to identify the resource location, resource navigation and positional data (e.g., compression type, data precision, image height, image width, reference to the base uniform resource identifier, reference to the navigational operation vector and reference to the scroll location).

In step 505, computing device 102 stores the identified resource location, resource navigation and positional data, such as in memory or storage (e.g., memory 205, disk unit 208).

In step 506, computing device 102 displays the screen capture image with an option for replicating the source environment. Such an option may be selected by the user of computing device 102 in many manners, such as via an icon, a pull-down menu, an option button, a check box, etc.

In step 507, a determination is made by computing device 102 as to whether the user indicates to replicate the source environment. That is, a determination is made by computing device 102 as to whether the user of computing device 102 indicates to locate the original resource of the screen capture image. In one embodiment, such an indication can be made by the user selecting an option, such as via an icon, a pull-down menu, an option button, a check box, etc., for locating the original resource of the screen capture image displayed on display 215 of computing device 102.

If the user does not indicate to replicate the source environment, then computing device 102 continues to determine whether the user indicates to replicate the source environment in step 507.

If, however, the user indicates to replicate the source environment, then, in step 508, computing device 102 reproduces the state of the source environment when the image was screen captured using the stored resource location, resource navigation and positional data as illustrated in FIG. 4.

Referring to FIG. 4, computing device 102 extracts the values 404 of the embedded metadata from the screen capture image to identify the resource location, resource navigation and positional data. For example, as illustrated in FIG. 4, such extracted values 404 may indicate that the compression type is a baseline compression type, that the number of bits of data precision is eight bits, that the image height corresponds to 1,536 pixels and the image width corresponds to 2,048 pixels. Furthermore, the extracted values 404 may include the uniform resource identifier, the navigational operation vector and the scroll location.

Such information may be utilized by computing device 102 to reproduce the state of the source environment when the image was captured (i.e., opening the source document 405 on display 215 in the same state as represented in the screen capture image) using the stored resource location, resource navigation and positional data as shown in FIG. 4. In this manner, a user is able to reproduce the state of the source environment when the image was captured thereby opening the resource represented in the image.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for facilitating access to a resource represented in an image at a later time, the method comprising:
   implementing a screen capture of an image displayed on a first user's computing device;
   generating, by a processor, metadata comprising resource location, resource navigation and positional metadata regarding source data of said screen capture image representing a state of a source environment in which said screen capture is implemented;
   embedding said generated metadata into said screen capture image; and
   transmitting said screen capture image with said embedded metadata to a second user.

2. The method as recited in claim 1, wherein said resource location metadata comprises a uniform resource locator of a webpage.

3. The method as recited in claim 1, wherein said resource navigation metadata comprises an ordered vector of uniform resource locator requests.

4. The method as recited in claim 1, wherein said positional metadata comprises one or more of a scroll location, a device resolution, a width and a height of said screen capture image.

5. The method as recited as recited in claim 1, wherein said metadata is embedded in a preamble or a postamble in image data.

6. The method as recited in claim 1, wherein said metadata is embedded as steganographic data directly into pixels of said screen capture image.

7. The method as recited in claim 1 further comprising:
   receiving said screen capture image with said embedded metadata by said second user; and extracting said embedded metadata from said screen capture image to identify resource location, resource navigation and positional data.

8. The method as recited in claim 7 further comprising:

storing said resource location, resource navigation and positional data.

9. The method as recited in claim 8 further comprising:

reproducing said state of said source environment when said image was screen captured using said stored resource location, resource navigation and positional data in response to said second user indicating to replicate said source environment.

\* \* \* \* \*